(12) United States Patent
Kobayashi et al.

(10) Patent No.: US 7,630,818 B2
(45) Date of Patent: Dec. 8, 2009

(54) INTELLIGENT DRIVING ASSISTANCE METHOD AND SYSTEM

(75) Inventors: Yosuke Kobayashi, Yokohama (JP); Genpei Naito, Yokohama (JP); Takeshi Kimura, Yokohama (JP); Yukinori Nishida, Yokohama (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 653 days.

(21) Appl. No.: 11/135,347

(22) Filed: May 24, 2005

(65) Prior Publication Data

US 2005/0279554 A1 Dec. 22, 2005

(30) Foreign Application Priority Data

Jun. 16, 2004 (JP) ............................ P2004-177965

(51) Int. Cl.
*B60T 7/12* (2006.01)
*B60T 7/16* (2006.01)
*B60Q 1/00* (2006.01)

(52) U.S. Cl. ........................... 701/96; 340/435; 180/169

(58) Field of Classification Search .................... 701/70, 701/96; 340/435; 180/169
See application file for complete search history.

(56) References Cited

U.S. PATENT DOCUMENTS

2003/0060936 A1* 3/2003 Yamamura et al. .............. 701/1

2003/0106732 A1* 6/2003 Watanabe et al. ........... 180/169
2004/0080405 A1* 4/2004 Hijikata ...................... 340/435

FOREIGN PATENT DOCUMENTS

| EP | 1 375 232 A1 | 1/2004 |
| EP | 1375232 A1 * | 1/2004 |
| JP | 10-166890 | 6/1998 |
| JP | 2004-067070 | 3/2004 |

OTHER PUBLICATIONS

Japanese Office Action, with English translation, issued in Japanese Patent Application No. JP 2004-177965, mailed Mar. 17, 2009.

* cited by examiner

*Primary Examiner*—Mark Hellner
*Assistant Examiner*—Helal A Algahaim
(74) *Attorney, Agent, or Firm*—McDermott Will & Emery LLP

(57) ABSTRACT

An intelligent driving assistance system for used in a vehicle to convey information related to a future variation of a relative spatial relationship between the vehicle and an object, even before the actual variation occurs. The system includes a detector configured to detect a driving condition of the vehicle and a condition of an object in a field around the vehicle, and a data processor, in anticipation of a future decrease of a distance between the vehicle and the object, regulating a reaction force applied to a driver control device of the vehicle.

30 Claims, 12 Drawing Sheets

|  |  | D | Vr |
|---|---|---|---|
| DECREMENT | START | AT MOMENT IMMEDIATELY AFTER D HAS INCREASED | — |
| | END | — | AT MOMENT IMMEDIATELY AFTER Vr HAS DECREASED AFTER INCREASE IN Vr |
| INCREMENT | START | — | AT MOMENT IMMEDIATELY AFTER Vr HAS DECREASED AFTER INCREASE IN Vr |
| | END | AT MOMENT IMMEDIATELY AFTER D HAS INCREASED | — |

US 7,630,818 B2

INTELLIGENT DRIVING ASSISTANCE METHOD AND SYSTEM

RELATED APPLICATION

The present application claims the benefit of priority from Japanese Patent Application No. 2004-177965, filed Jun. 16, 2004, the disclosure of which is incorporated herein by reference in its entirety.

FIELD OF THE DISCLOSURE

The present disclosure relates to an intelligent driving assistance method and system for assisting a driver operating a vehicle, and more specifically, to an intelligent driving assistance method and system for use in a vehicle to convey information related to a future variation of a relative spatial relationship between the vehicle and an object, even before the actual variation occurs.

BACKGROUND OF THE DISCLOSURE

Various methods and systems were available for assisting a driver to operate a vehicle. One example of such systems is proposed in US 2003/0060936 A1, published Mar. 27, 2003 (application Ser. No. 10/226,232). This system comprises a controller, at least one actuator, and a data acquisition system for acquiring data related to a vehicle and environment in a field around the vehicle. The controller determines a future environment in the field around the vehicle using the acquired data, and generates an operator response plan in response to the determined future environment. The plan prompts the operator to operate the vehicle in a desired manner. The actuator is coupled to a driver controlled input device to mechanically affect operation of the input device in a manner that prompts, via a haptic input to the driver to operate the vehicle in the desired manner.

Another example of conventional driving assistance systems is proposed in JP10-166890. The system alters setting of a reaction force applied to a driver of a host vehicle via an accelerator pedal based on a distance between the host vehicle and the preceding vehicle. According to this system, a decrease in the distance causes an increase in the reaction force to convey information related to the reduced distance to the driver.

These known systems do not transmit a change in the status of the preceding vehicle to the driver at appropriate timing via the reaction force applied to the accelerator pedal, due to calculation delays by a controller to alter the reaction force and delays in the driver's recognition of the status change caused by the calculation delays. Consequently, the driver cannot perceive the changed status of the preceding vehicle soon enough via the reaction force applied to the acceleration pedal.

Accordingly, there is a need for a method and system for use in a host vehicle to convey information related to a future variation of a relative spatial relationship between the host vehicle and another vehicle, even before the actual variation occurs. There is another need for a system and method to transmit a change in an inter-vehicle distance between the host vehicle and other vehicles before the distance actually decreases.

SUMMARY OF THE DISCLOSURE

Various embodiments are disclosed relating to intelligent driving assistance methods and systems that adjust the operation of a vehicle in anticipation of a future decrease of a distance between the vehicle and an object in a field around the vehicle, so as to reduce the operation risk associated with the vehicle.

An exemplary driving assisting system comprises a detector configured to detect a driving condition of a vehicle and a condition of an object in a field around the vehicle, and a data processor, in anticipation of a future decrease of a distance between the vehicle and the object, regulates a reaction force applied to a driver control device of the vehicle. In one aspect, the detector is configured to detect at least one of a relative speed between the object relative to the vehicle, and a relative distance between the vehicle and the object, and the data processor anticipates the future decrease of the distance based on a change of the relative speed.

According to one embodiment, the data processor determines a trend of the relative speed, and regulates the reaction force based on a change of the trend of the relative speed. According to another embodiment, the relative speed represents a speed of the object relative to the vehicle, and the object is in front of the vehicle. The data processor is configured to initiate an increase of the reaction force applied to the driver control device that is experienced by the driver of the vehicle, in response to the relative speed changing from an increasing relative speed to a non-increasing relative speed. The data processor may further perform the step of responsive to the relative speed decreasing to zero, stopping the increase of the reaction force.

According still another embodiment, the data processor is configured to further perform the step of responsive to the relative distance changing from a non-increasing distance to an increasing distance, stopping an increase of the reaction force. According to a further embodiment, the relative speed represents a speed of the object relative to the vehicle, and the data processor is configured to further perform the step of responsive to the relative speed changing from a non-increasing speed to an increasing speed, or the relative distance changing from a non-increasing distance to an increasing distance, initiating a reduction of the reaction force applied to the driver control device that is experienced by the driver of the vehicle. In one aspect, the data processor is configured to further perform the step of responsive to the relative speed changing from an increasing speed to a non-increasing speed, stopping the reduction of the reaction force.

In another embodiment, the reaction force is regulated in such a way that a rate of change of the reaction force varies with a collision risk potential between the vehicle and the object. The data processor may changes the reaction force associated with a higher collision risk potential more significantly than the reaction force associate with a lower collision risk potential. In one aspect, the reaction force is regulated by applying a correction amount to the reaction force. The correction amount may be adjustable by applying an increment amount or a decrement amount to the correction amount. The correction amount may have a maximum value and a minimum value. In another aspect, the minimum value of the correction amount is adjustable based on the collision risk potential between the vehicle and the object. In still another aspect, the minimum value for the reaction force increases with the value of time headway (THW) between the vehicle and the object. In a further aspect, at least one of the increment amount and the decrement amount is adjustable based on the collision risk potential between the vehicle and the object. In still another aspect, the data processor is configured to adjust the correction amount by applying one of the increment amount and the decrement amount to the correction amount. Responsive to the decrement amount being applied to the correction amount, the data processor compares the adjusted correction amount with the minimum value of the correction amount. Responsive to the adjusted correction amount being larger than the minimum correction amount, the data processor adjusts the reaction force by applying the adjusted correction amount to the reaction force; and responsive to the adjusted correction amount being smaller than the minimum correction amount, the data processor adjusts the reaction force by applying the minimum correction value of the correction amount to the reaction force. In response to the increment amount being applied to the correction amount, the data processor compares the adjusted correction amount with the maximum value of the correction amount. Responsive to the adjusted correction amount being smaller than the maximum correction amount, the data processor adjusts the reaction force by applying the adjusted correction amount to the reaction force; and responsive to the adjusted correction amount being larger than the maximum correction amount, the data processor adjusts the reaction force by applying the maximum correction value of the correction amount to the reaction force.

According one embodiment, the timing to start and stop regulating the reaction force are determined based on the relative distance and the relative speed. According to another embodiment, the data processor regulates the reaction force in such a way that a change in the reaction force reflects a change in the distance between the vehicle and the object. According to still another embodiment, the correction amount is adjusted to increase or decrease at the same rate, to increase faster than decrease, or to increase slower than decrease. The data processor may perform the step of responsive to the relative distance changing from a non-decreasing distance to a decreasing distance, stopping the increase of the reaction force.

According to another embodiment, a vehicle includes a driver control device configured to allow a driver to manipulate the vehicle, a detector configured to detect a driving condition of the vehicle and a condition of an object in a field around the vehicle; and a data processor, in anticipation of a future decrease of a distance between the vehicle and the object, regulating a reaction force applied to the driver control device of the vehicle.

According to yet another embodiment, an exemplary driving assisting system comprises a detector configured to detect a relative speed between the vehicle and an object in a field around the vehicle, and a relative distance between the vehicle and the object; and a data processor configured to regulate a reaction force applied to a driver control device of the vehicle based on the relative speed and the relative distance.

Additional advantages and novel features of the present disclosure will be set forth in part in the description which follows, and in part will become apparent to those skilled in the art upon examination of the following, or may be learned by practice of the present disclosure. The embodiments shown and described provide an illustration of the best mode contemplated for carrying out the present disclosure. The disclosure is capable of modifications in various obvious respects, all without departing from the spirit and scope thereof. Accordingly, the drawings and description are to be regarded as illustrative in nature, and not as restrictive. The advantages of the present disclosure may be realized and attained by means of the instrumentalities and combinations particularly pointed out in the appended claims.

BRIEF DESCRIPTION OF THE DRAWINGS

The present disclosure is illustrated by way of example, and not by way of limitation, in the accompanying drawings, wherein elements having the same reference numeral designations represent like elements throughout.

DETAILED DESCRIPTION OF THE DISCLOSURE

In the following description, for the purposes of explanation, numerous specific details are set forth in order to provide a thorough understanding of the present disclosure. It will be apparent, however, to one skilled in the art that concepts of the disclosure may be practiced or implemented without these specific details. In other instances, well-known structures and devices are shown in block diagram form in order to avoid unnecessarily obscuring the present disclosure.

First Exemplary Embodiment

Figure 1:
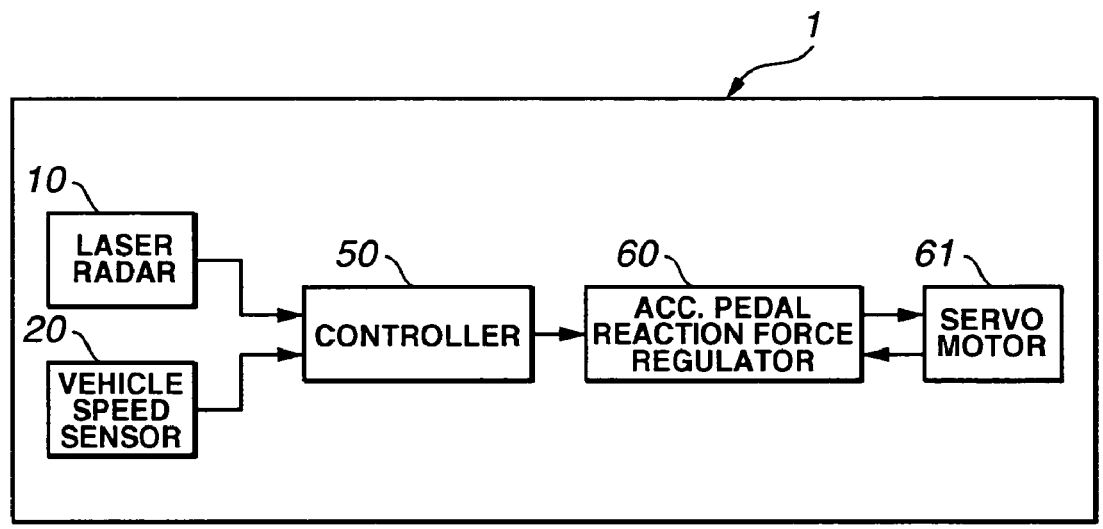
FIG. 1 is a block diagram of a method and system for assisting a driver operating a driver controlled input device of a vehicle according to the present disclosure.
Figure 2:
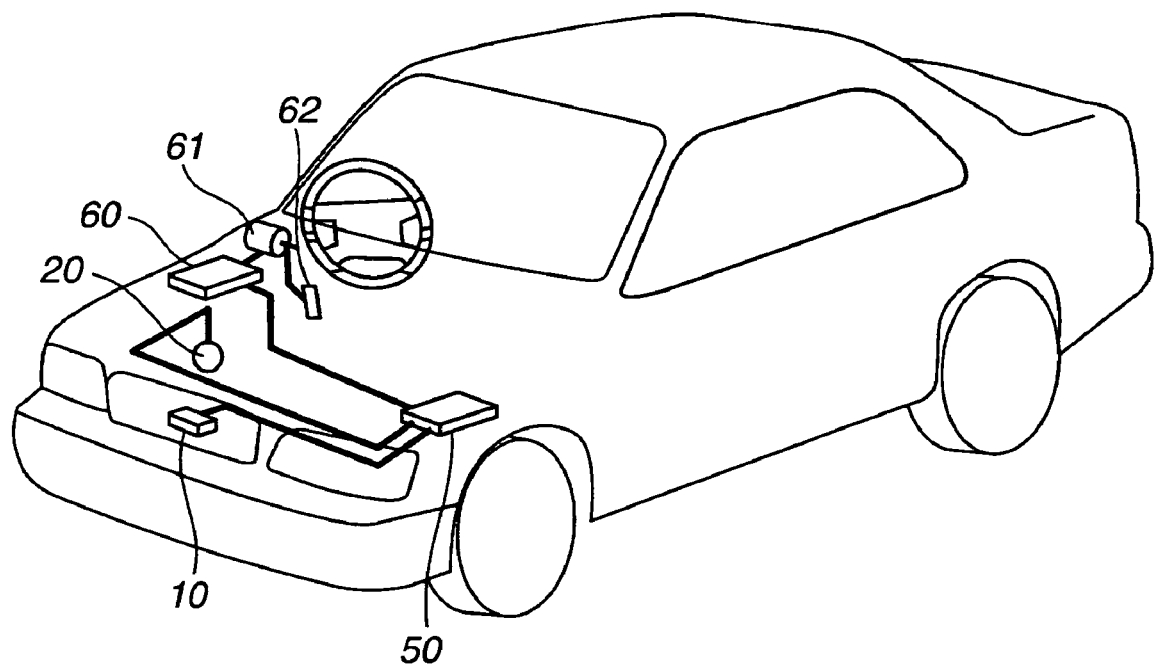
FIG. 2 is a perspective view of a vehicle in the form of a motor vehicle installed with the system shown in FIG. 1.

Referring to FIGS. 1 and 2, the first exemplary embodiment is described. The block diagram in FIG. 1 illustrates the first exemplary embodiment of a system 1 for assisting a driver operating a vehicle traveling on a road. FIG. 2 is a perspective view of a motor vehicle installed with system 1.

System 1 has a radar 10 positioned at the center of a front grill or a front bumper of a host vehicle (see FIG. 2) for transmitting pulsed beam or radar waves ahead of the vehicle in order to detect obstacles within the field of view of the radar 10. Although it may be a conventional millimeter wave, frequently modulated continuous (FMCW) radar, radar 10, in this embodiment, is a laser-radar. An infrared pulsed beam travels, as a transmitted beam, toward a measurement zone. A light receiving device receives the transmitted beam returning from an obstacle within the measurement zone. Due to the use of a rotating polygonal mirror, two-dimensional scanning in the forward direction is possible, so that the pulsed beam is swiveled horizontally due to the rotation of the polygonal mirror, and the pulsed beam is swiveled vertically due to a plurality of mirror surfaces of the polygonal mirror inclined at different angles. According to one embodiment, the pulsed beam is swiveled horizontally and laterally about 6 degrees to each side of a longitudinal line passing through the center of the vehicle.

Based on the time delay and phase difference between the transmitted beam from the laser radar 10 and the received reflected beam, a control logic determines a distance and azimuth angle between the host vehicle and each of the detected obstacle(s). The distance and azimuth angle are provided to a controller 50.

A vehicle speed sensor 20 detects a vehicle speed of the host vehicle by measuring the number of revolutions of wheels or an output element of a power transmission, and provides the detected vehicle speed to controller 50.

Controller 50, which is responsible for overall control over system 1, may contain a microprocessor including a central processing unit (CPU), and a computer readable storage medium, such as a read only memory (ROM) or a random access memory (RAM). Controller 50 processes the vehicle speed of the host vehicle based on signals generated by vehicle speed sensor 20, and the distance and azimuth angle based on signals generated by the laser radar 10 to determine the running state of the host vehicle with regard to each of the obstacles detected by laser radar 10. The running state is indicated by the distance and relative speed between the host vehicle and each of the obstacles. Based on the status of each of the obstacles, controller 50 calculates a risk potential RP with regard to each of the obstacles. The risk potential RP is a degree of risk of collision between the host vehicle and each of the obstacles. Based on the calculated risk potential RP with regard to each of the obstacles, controller 50 conducts the following control.

According to the first exemplary embodiment, system 1 regulates a reaction force to transmit information related to the circumstance around the host vehicle to the driver via an accelerator pedal 62, and to appropriately assist the driver in operation of accelerator pedal 62 for longitudinal control of the host vehicle, thus providing an appropriate assist to the driver in driving the host vehicle. Based on the risk potential RP with regard to a selected one of the obstacles in front of the host vehicle, controller 50 calculates an optimum magnitude by which the reaction force via accelerator pedal 62 should vary.

Assume that an inter-vehicle distance between a host vehicle and the preceding vehicle in front of the host vehicle increases first and then subsequently decreases. In order to clearly transmit this increase and the subsequent decrease to a driver operating the host vehicle, a reaction force input via the accelerator pedal is slightly decreased to inform the driver of the increase with respect to the inter-vehicle distance. The reaction force input is then increased quickly to inform the driver regarding the decrease in the inter-vehicle distance. This change in the reaction force input informs the driver about the increase and the subsequent decrease in the inter-vehicle distance.

According to one embodiment, a relative speed Vr between the host vehicle and the preceding vehicle is given by subtracting a vehicle speed V2 of the preceding vehicle from a vehicle speed V1 of the host vehicle (Vr=V2−V1). The relative speed Vr indicates an increase in the inter-vehicle distance when it has a positive sign, and indicates a decrease in the inter-vehicle distance when the relative speed Vr has a negative sign. However, if the reaction force applied to the accelerator pedal is increased immediately after the relative speed Vr has changed to a negative value to indicate a decrease in the inter-vehicle distance, the inter-vehicle distance has already decreased when the driver receives such information due to a delay in arithmetic operation of controller 50 and a delay in perception by the driver of the increase in the reaction force via the accelerator pedal.

According to an embodiment of this disclosure, controller 50 transmits, without any delay, information related to a change in the inter-vehicle distance. Particularly, information related to an increase in the inter-vehicle distance followed by the subsequent decrease in the inter-vehicle distance, is transmitted to the driver of the host vehicle by correcting a reaction force control value. The corrected reaction force control value us fed to the accelerator pedal reaction force regulator 60.

In response to the corrected reaction force control value provided by controller 50, accelerator pedal reaction force regulator 60 regulates torque produced by a servo motor 61 that is part of a link mechanism of an accelerator pedal 62. In each of the exemplary embodiments, accelerator pedal 62 constitutes one of various examples of a driver controlled input device of the vehicle. Servo motor 61 regulates the reaction force produced via accelerator pedal 62 in response to a command value from accelerator pedal reaction force regulator 60, thus regulating the magnitude of manual effort required by the driver to keep the accelerator pedal unaltered in pedal position.

When accelerator pedal reaction force regulator 60 ceases to regulate the torque produced by servo motor 61, the reaction force produced via accelerator pedal 62 has an ordinary accelerator pedal reaction force characteristic. According to the ordinary accelerator pedal reaction force characteristic, the reaction force via accelerator pedal 62 increases linearly as the depressed pedal position of accelerator pedal 62 increases. This ordinary accelerator pedal reaction force characteristic is realized by a spring force produced by a torsion spring provided around the center of pivotal movement of accelerator pedal 62

Figure 3:
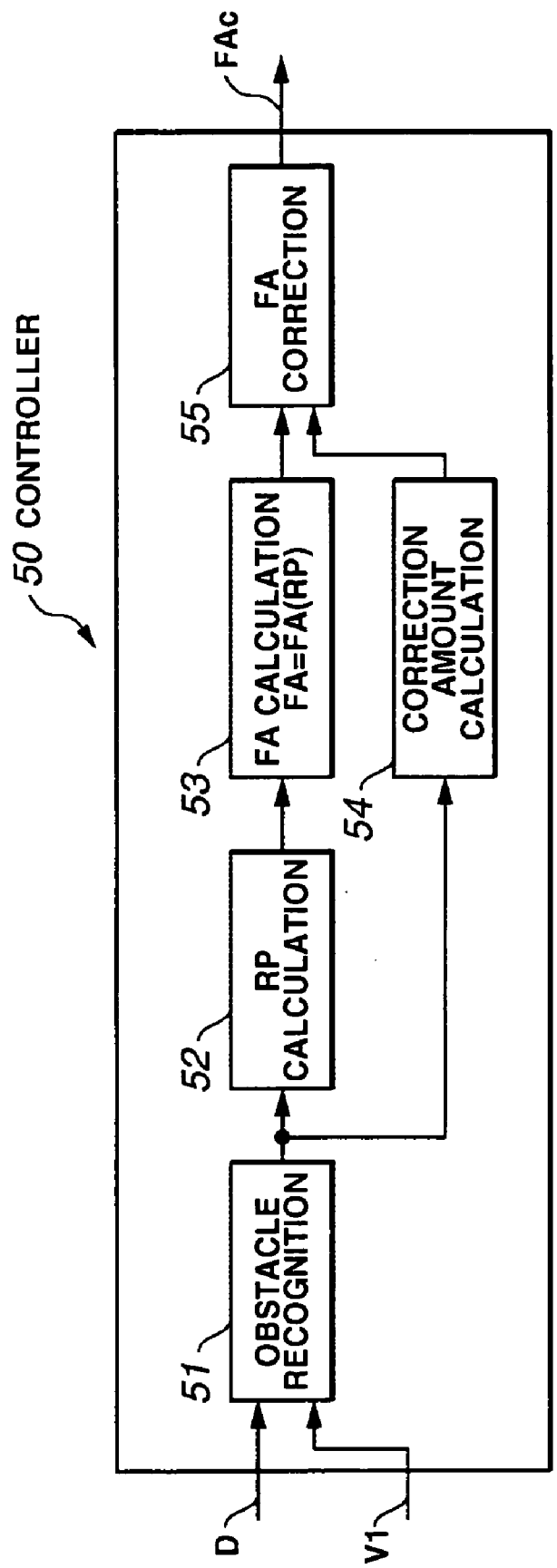
FIG. 3 is a block diagram of the controller shown in FIG. 1.

Referring to FIG. 3, the block diagram illustrates a block diagram of controller 50. Controller 50, a software implementation of a central processor unit (CPU), includes an obstacle recognition 51, a risk potential (RP) calculation 52, an accelerator pedal reaction force instruction value (FA) calculation 53, a correction amount calculation 54 and a FA correction 55.

Obstacle recognition 51 recognizes the state of obstacles in front of the host vehicle by receiving signals from laser radar 10 and vehicle speed sensor 20. Obstacle recognition 51 calculates an inter-vehicle distance D between the host vehicle and the preceding vehicle in front of the host vehicle, a relative speed Vr therebetween, and detects a vehicle speed V1 of the host vehicle. Based on the recognition result of obstacle recognition 51, RP calculation 52 calculates a risk potential (RP) indicative of a collision risk between the host vehicle and the preceding vehicle. Based on the calculated risk potential RP, the accelerator pedal reaction force instruction (FA) calculation 53 calculates a reaction force instruction value FA.

Based on the inter-vehicle distance D and relative speed Vr calculated at the obstacle recognition 51, correction amount calculation 54 calculates a correction amount by which the reaction force via the accelerator pedal should vary. FA correction 55 corrects the reaction force instruction value FA based on the correction amount calculated by the correction amount calculation 54, to provide a corrected reaction force instruction value FAc.

Figure 4:
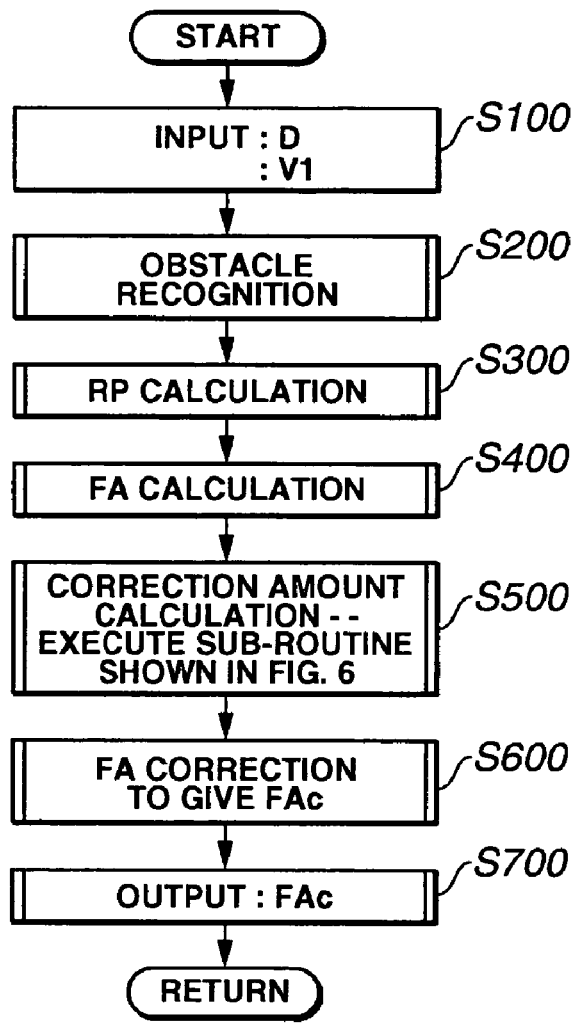
FIG. 4 is a flow chart of a main routine illustrating the operation of the first exemplary embodiment.

FIG. 4 is a flow chart illustrating a control routine of driver assisting processes carried out by the first exemplary embodiment of controller 50. Execution of the routine is repeated at regular intervals of a predetermined period of time, such as 50 milliseconds.

In FIG. 4, at step S100, controller 50 receives an inter-vehicle distance D between the host vehicle and each obstacle in front of the host vehicle, and an azimuth angle indicating a direction pointing at each obstacle based on signals generated by laser radar 10. Controller 50 also receives a vehicle speed V1 of the host vehicle based on signals from vehicle speed sensor 20.

At step S200, controller 50 determines the state of obstacles based on data received at the step S100. Controller 50 recognizes a position of each obstacle relative to the host vehicle, a direction in which each obstacle is moving relative to the host vehicle, and a speed at which each obstacle is moving relative to the host vehicle based on new values of the position, direction and speed obtained and received at the step S100 during the present processing cycle and the old values thereof that were obtained prior to the present processing cycle and stored in a memory of controller 50.

At step S300, controller 50 calculates a risk potential RP with respect to each obstacle. The risk potential RP is a collision risk between the host vehicle and each obstacle. Detailed descriptions of a collision risk calculation process are described below.

Controller 50 calculates a time to contact TTC with respect to each obstacle. TTC is indicative of a degree of approach to the preceding vehicle in front of the host vehicle, and it is a measure of time from a present point in time to a future point in time when the distance D would become zero if the relative speed Vr remains unchanged. The TTC may be expressed as:

$$TTC=-D/Vr \quad (Eq. 1)$$

The smaller the value of TTC, the more imminent the host would come to contact with the preceding vehicle, and the larger is the value of a degree of approach to the preceding vehicle. In a scenario in which the host vehicle is following the preceding vehicle, most vehicle drivers perceive a high degree of collision risk and initiate deceleration to avoid collision well before the TTC becomes less than 4 seconds. To some extent, the TTC is a good indication for predicting a future behavior of the vehicle driver. However, when it comes to quantifying the degree of risk, which the vehicle driver actually perceives, there is discrepancy between the TTC and the degree of risk. Thus, the TTC alone is insufficient to quantify the degree of risk.

Such discrepancy may be confirmed by considering a traffic scene in which the relative speed Vr between the host vehicle and the preceding vehicle is zero. In this case, the TTC is infinite irrespective of how short the distance D is. However, the driver perceives an increase in the degree of risk in response to a reduction in the distance D, in view of an increase in influence on the TTC by an unpredictable drop in the vehicle speed V2 of the preceding vehicle.

To address the above-mentioned discrepancy, the notion of time headway THW has been introduced to quantify an increased influence on the TTC by an unpredictable drop in the vehicle speed of the preceding vehicle. The THW is a measurement of a timer that is set to count up when the preceding vehicle reaches a point on the road, and is reset subsequently when the following vehicle reaches the same point. The THW is expressed as:

$$THW=D/V1 \quad (Eq. 2)$$

In the case where the host vehicle is following the preceding vehicle, the vehicle speed V2 of the preceding vehicle may be used instead of the vehicle speed V1 of the host vehicle in the above-mentioned equation Eq. 2.

The relationship between TTC and THW is such that a change in vehicle speed V2, if any, of the preceding vehicle results in a small change in the TTC when the THW is long, but the same change in vehicle speed V2 of the preceding vehicle results in a large change in the TTC when the THW is short.

In this exemplary embodiment, the risk potential RP is calculated using the reciprocal of the TTC and the reciprocal of the THW. The risk potential RP may be expressed as:

$$RP=a/THW+b/TTC \quad (Eq. 3)$$

where: b and a (b>a) are parameters weighting 1/TTC and 1/THW, respectively, such that 1/THW is less weighted than 1/TTC. The values of b and a are optimized after accounting for a statistics of values of THW and TTC collected in a traffic scene including the host vehicle and the preceding vehicle. In this exemplary embodiment, b=8 and a=1.

At step S400, based on the risk potential RP calculated at step S300, controller 50 calculates an accelerator pedal reaction force instruction value FA, i.e., FA=FA(PR).

Figure 5:
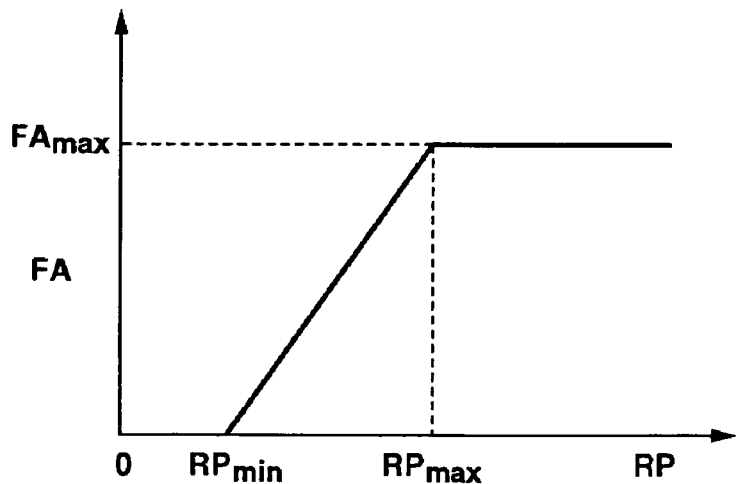
FIG. 5 is a graphical representation of varying of an accelerator pedal reaction force instruction value FA with different values of a risk potential RP.

Referring to FIG. 5, the solid line illustrates values of accelerator pedal reaction force instruction value FA changing with different values of risk potential RP. As shown in FIG. 5, when the risk potential RP is less than a first predetermined value $RP_{min}$, the accelerator pedal reaction force instruction value FA is zero. When the risk potential RP exceeds the first predetermined value $RP_{min}$ but less than a second predetermined value $RP_{max}$, the accelerator pedal reaction force instruction value FA is increased in proportion to the risk potential RP. The accelerator pedal reaction force value FA reaches a maximum value $FA_{max}$ when the risk potential RP reaches the second predetermined value $RP_{max}$. When the risk potential RP exceeds the second predetermined value $RP_{max}$, the accelerator pedal reaction force value FA is maintained at the maximum value $FA_{max}$. When the accelerator pedal reaction force instruction value FA is zero, the reaction force applied to accelerator pedal 62 varies in accordance with the ordinary accelerator pedal reaction force characteristic. When the accelerator pedal reaction force instruction value FA is increased to be larger than zero, the reaction force applied to accelerator pedal 62 exceeds the ordinary accelerator pedal reaction force characteristic. With the same depressed position of the accelerator pedal, the magnitude by which the reaction force applied to the accelerator pedal exceeding the ordinary accelerator pedal reaction force characteristic is proportional to the accelerator pedal reaction force instruction value FA when the risk potential RP exceeds the first predetermined value $RP_{min}$ until it reaches the second predetermined value $RP_{max}$.

When the risk potential RP is not greater than the second predetermined value $RP_{max}$, the risk potential RP is transmitted to the driver by the reaction force applied to accelerator pedal 62 because the reaction force is proportional to the risk potential RP. When the risk potential RP exceeds the second predetermined value $RP_{max}$, the reaction force is kept at the maximum level to prompt the driver to releasing accelerator pedal 62.

Figure 6:
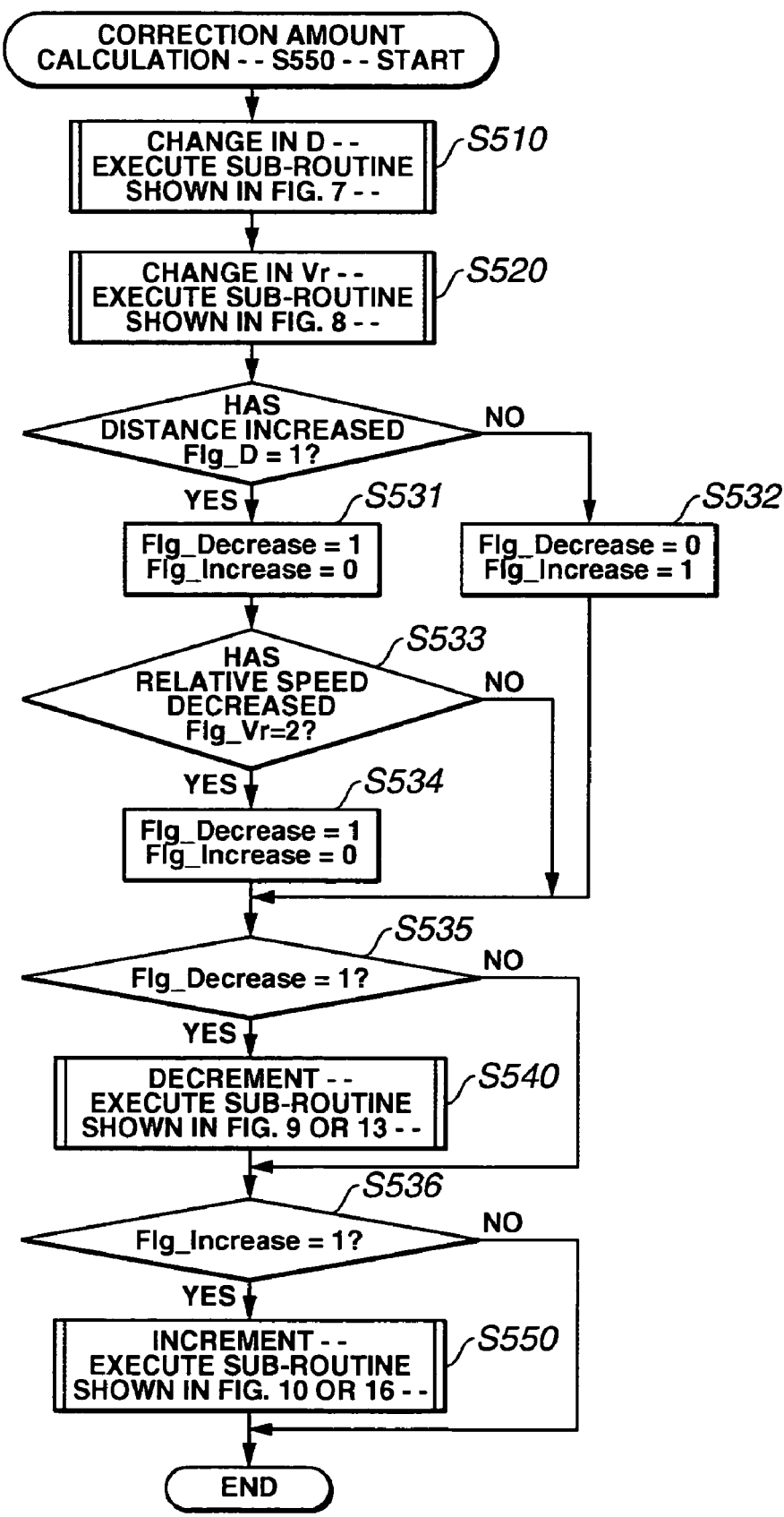
FIG. 6 is a flow chart of a sub-routine to calculate a reaction force correction amount $FA_{hosei}$.

At step S500, controller 50 performs a correction amount ($FA_{hosei}$) calculation by executing a sub-routine shown in FIG. 6.

Figure 7:
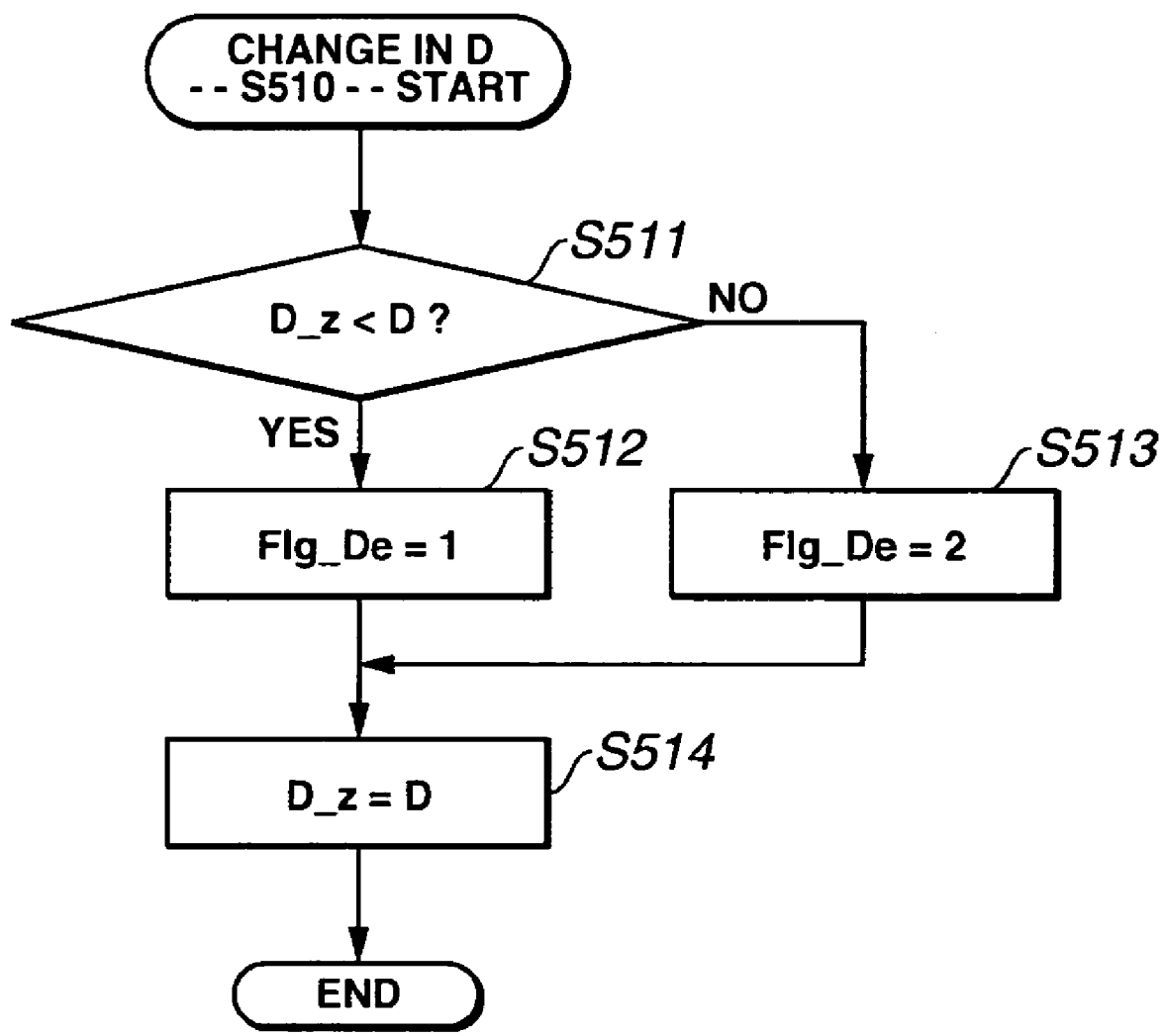
FIG. 7 is a flow chart of a sub-routine to evaluate a change in inter-vehicle distance D.

Referring to FIG. 6, at step S510, controller 50 determines whether a change in inter-vehicle distance D between the host vehicle and the preceding vehicle is increasing or decreasing by executing a sub-routine shown in FIG. 7.

Referring to FIG. 7, at step S511, controller 50 compares the present value of inter-vehicle distance D detected at step S100 during the present processing cycle to an old value of inter-vehicle distance D_z, which was detected during the previous processing cycle. At step S511, controller 50 determines whether or not the present value of inter-vehicle distance D is greater than the old value of inter-vehicle distance D_z.

If the present value of inter-vehicle distance D is greater than the old value of inter-vehicle distance D_z (D_z<D), the routine proceeds to step S512. At step S512, controller 50 sets an inter-vehicle distance flag Flg_D equal to 1, which indicates that the inter-vehicle distance D is increasing. If the present value of inter-vehicle distance D is no more than the old value of inter-vehicle distance D_z (D_z≧D), the routine proceeds to step S513. At step S513, controller 50 sets the inter-vehicle distance flag Flg_D equal to 2, which indicates that the inter-vehicle distance D is unaltered or decreasing.

At step S514, controller 50 sets the present value of inter-vehicle distance D as the old value of inter-vehicle distance D_z and ends the present processing. After determining at step S510 whether or not the inter-vehicle distance D is increasing or decreasing, controller 50 proceeds to step S520 of the main routine shown in FIG. 6.

Figure 8:
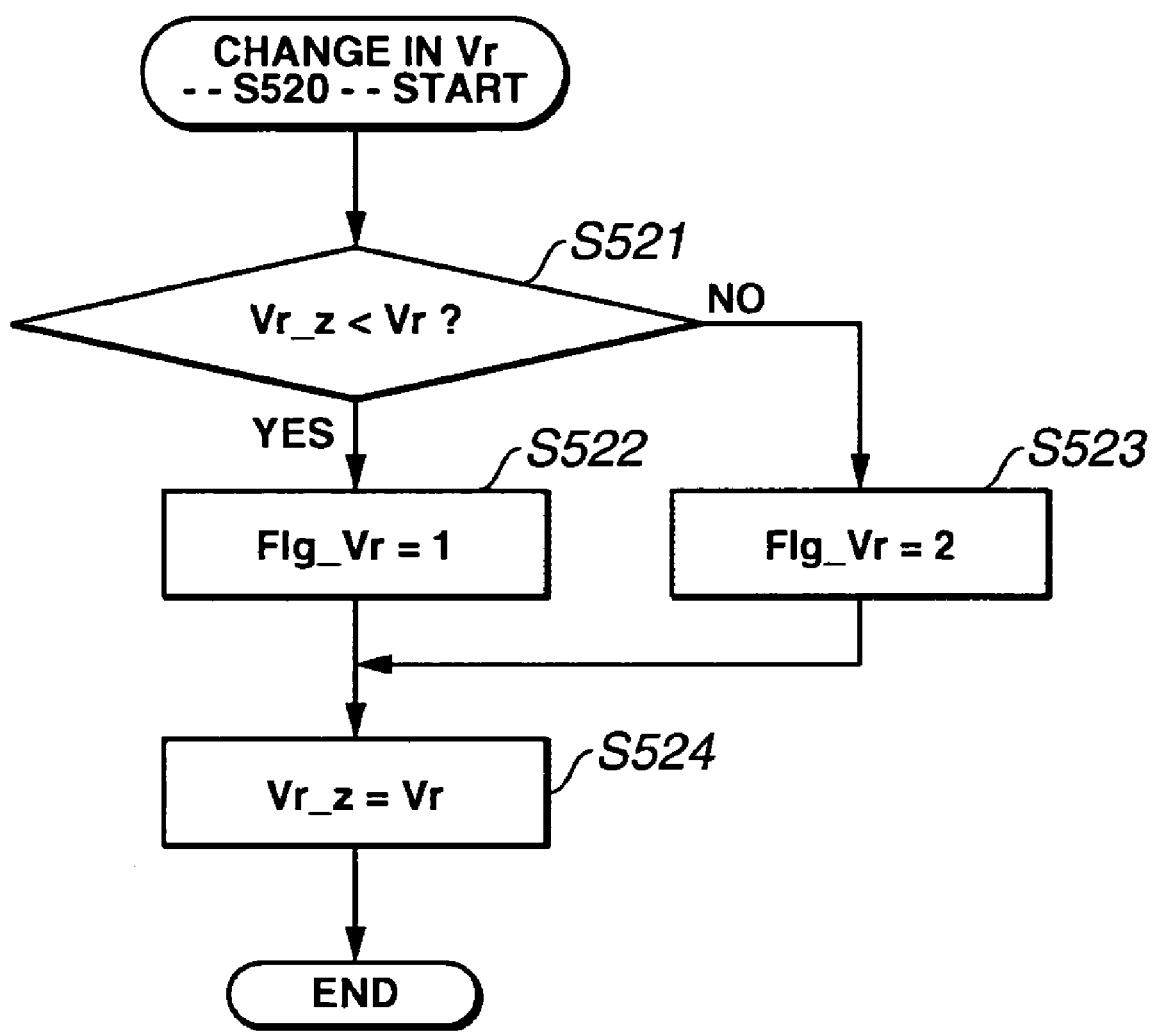
FIG. 8 is a flow chart of a sub-routine to evaluate a change in relative speed Vr.

At step S520, controller 50 determines whether relative speed Vr between the host vehicle and the preceding vehicle is increasing or decreasing by executing a sub-routine shown in FIG. 8.

Referring to FIG. 8, at step S521, controller 50 compares the present value of relative speed Vr detected at step S100 during the present processing cycle to the last value of relative speed Vr_z, which had been detected during the previous processing cycle. At step S521, controller 50 determines whether or not the present value of relative speed Vr is greater than the last value of relative speed Vr_z. If the present value of relative speed Vr is greater than the last value of relative speed Vr_z (Vr_z<Vr), the routine proceeds to step S522.

At step S522, controller 50 sets a relative speed flag Flg_Vr equal to 1, which indicates that the relative speed Vr is increasing. If the present value of relative speed Vr is less than or equal to the last value of inter-vehicle distance Vr_z (Vr_z≧Vr), the routine proceeds to step S523. At step S523, controller 50 sets the relative speed flag Flg_Vr equal to 2, which indicates that the relative speed Vr is unaltered or decreasing. At the next step S524, controller 50 sets the present value of relative speed Vr as the last value of relative speed Vr_z and ends the present processing. After determining whether the relative speed Vr is increasing or decreasing, controller 50 proceeds to step S530 of the main routine shown in FIG. 6.

In FIG. 6, at step S530, controller 50 determines whether the inter-vehicle distance D has increased by checking the flag Flg_D that was set at step S510. If the inter-vehicle distance flag Flg_D is equal to 1, the routine proceeds to step S531 because the inter-vehicle distance D is increasing and the host vehicle and the preceding vehicle are separating from each other. At step S531, controller 50 sets a flag Flg_Decrease equal to 1 and sets a flag Flg_Increase equal to 0. The flag Flg_Decrease is equal to 1, which indicates a need of decrement correction for the reaction force control instruction value FA, while the flag Flg_Increase is equal to 0, which indicates that no increment correction for the reaction force control instruction value FA is needed.

At the next step S533, controller 50 determines whether the relative speed Vr has decreased by checking the flag Flg_Vr. If the relative speed flag Flg_Vr is equal to 1, the routine proceeds to step S535 with the statuses of the flags Flg_Decrease=1 and Flg_Increase=0, which were set at step S531, unaltered.

If, at step S533, it is determined that the relative speed flag Flg_Vr is equal to 2 (Flg_Vr=2), the routine proceeds to step S534 because the relative speed Vr is decreasing, indicating a reduction in the inter-vehicle distance D. At step S534, controller 50 sets the flag Flg_Decrease equal to 0 and the flag Flg_Increase equal to 1. The flag Flg_Decrease is equal to 0, which indicates that there is no need of decrement correction for the reaction force control instruction value FA, and the flag Flg_Increase is equal to 1, which indicates that there is a need of increment correction for the reaction force control instruction value FA. Under this condition when the relative speed Vr has decreased wile the inter-vehicle distance D increases, the reaction force instruction value FA that has been corrected for decrement correction will be corrected for increment correction.

If, at step S530, it is determined that the inter-vehicle distance flag Flg_D is equal to 2 (Flg_D=2), the routine proceeds to step S532. At step S532, controller 50 sets the flag Flg_Decrease equal to 0, and the flag Flg_Increase equal to 1. The flag Flg_Decrease is equal to 0, which indicates no need of decrement correction for the reaction force control instruction value FA, while the flag Flg_Increase is equal to 1, which indicates a need of increment correction for the reaction force control instruction value FA. The routine proceeds to step S535 from step S532 or S534.

At step S535, controller 50 determines whether or not the flag Flg_Decrease is equal to 1. If, at step S535, it determines that the flag Flg_Decrease is equal to 1, the routine proceeds to step S540. At step S540, it carries out a decrement correction of the reaction force control instruction value FA by executing a sub-routine shown in FIG. 9.

Figure 9:
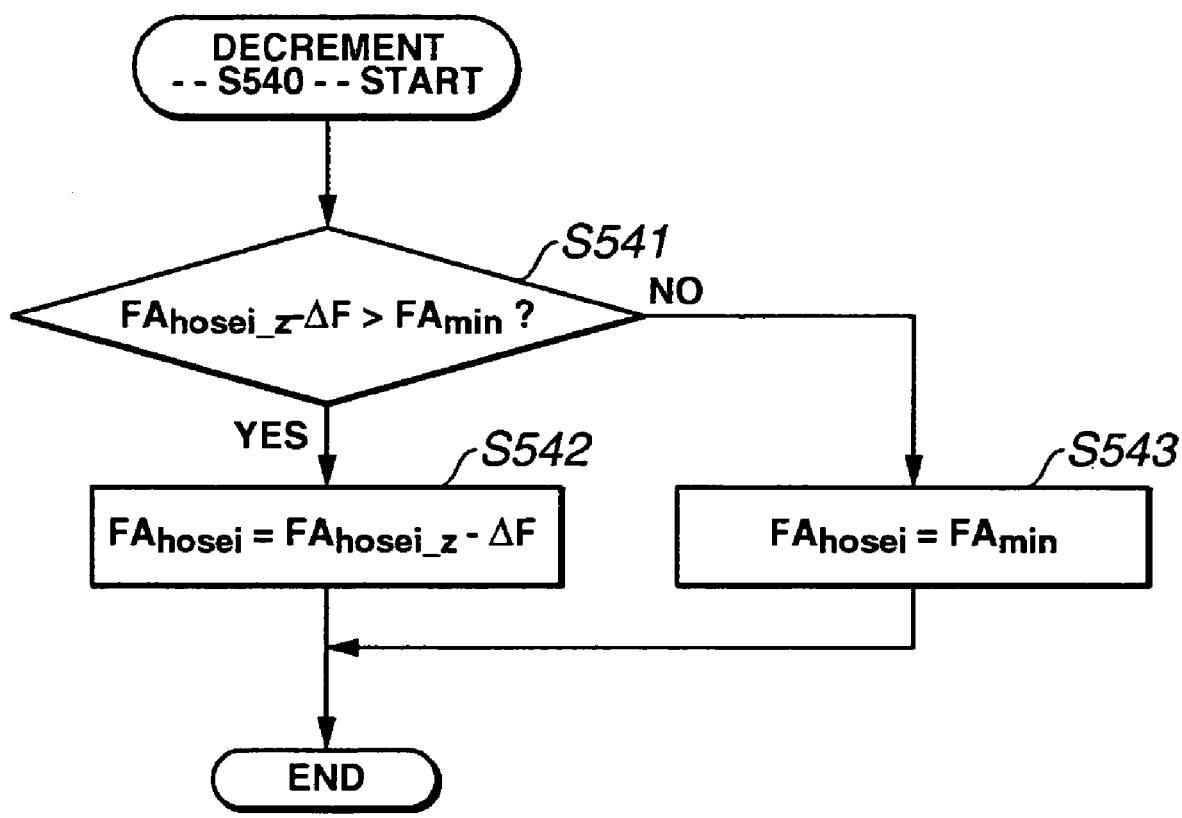
FIG. 9 is a flow chart of a sub-routine for decrement correction.

Referring to the sub-routine in FIG. 9, at step S541, controller 50 determines whether or not a minimum value $FA_{min}$ of the reaction force correction amount $FA_{hosei}$ is exceeded by a value given by subtracting a predetermined unit change ΔF from a last value of a reaction force correction amount $FA_{hosei\_z}$ that was set during the preceding cycle, ($FA_{hosei\_z}$−ΔF)>$FA_{min}$. If, at step S541, ($FA_{hosei\_z}$−ΔF) is greater than $FA_{min}$, the routine proceeds to step S542. At step S542, controller 50 sets the reaction force correction amount $FA_{hosei}$ equal to ($FA_{hosei\_z}$−ΔF), $FA_{hosei}$=$FA_{hosei\_z}$−ΔF. If, at step S541, ($FA_{hosei\_z}$−ΔF) is less than or equal to $FA_{min}$, the routine proceeds to step S543. At step S543, controller 50 sets the reaction force correction amount $FA_{hosei}$ equal to $FA_{min}$.

Turning to FIG. 6, if, at step S535, it determines that the flag Flg_Decrease is equal to 0, controller 50 does not carry out the decrement correction by passing step S540.

At the next step S536, controller 50 determines whether the flag Flg_Increase is equal to 1. If, at step S536, it determines that the flag Flg_Increase is equal to 1, the routine proceeds to step S550. At step S550, the system carries out an increment correction of the reaction force instruction value FA by executing a sub-routine in FIG. 10.

Figures 10, 11:
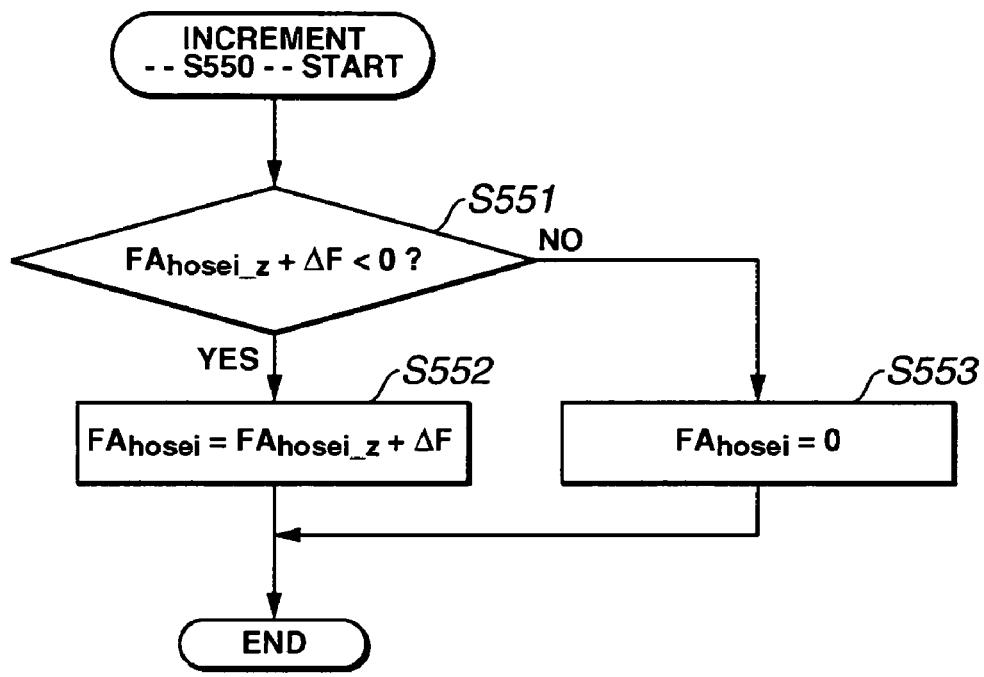
FIG. 10 is a flow chart of a sub-routine for increment correction.
FIG. 11 is a table tabulating a start and an end timing of decrement and increment corrections.

Referring to the sub-routine in FIG. 10, at step S551, controller 50 determines whether a value of adding the predetermined unit change ΔF to a last value of a reaction force correction amount $FA_{hosei\_z}$ that was set during the preceding cycle is less than 0, $((FA_{hosei\_z}+\Delta F)<0)$. If, at step S551, $(FA_{hosei\_z}+\Delta F)$ is less than 0, the routine proceeds to step S552. At step S552, controller 50 sets the reaction force correction amount $FA_{hosei}$ equal to $(FA_{hosei\_z}+\Delta F)$, that is, $FA_{hosei}=FA_{hosei\_z}+\Delta F$. If, at step S551, $(FA_{hosei\_z}+\Delta F)$ is greater or equal to 0, the routine proceeds to step S553. At step S553, controller 50 sets the reaction force correction amount $FA_{hosei}$ equal to 0.

Turning to FIG. 6, if, at step S36, it determines that the flag Flg_Increase is equal to 0 (Flg_Increase=0), controller 50 does not carry out the increment correction by passing step S550.

Turning to the main routine in FIG. 4, after the reaction force correction amount $FA_{hosei}$ has been calculated at step S500, the routine proceeds to step S600. At step S600, controller 50 adds the correction amount $FA_{hosei}$ to the reaction force control regulation value FA, to generate a corrected reaction force control instruction value FAc. The corrected reaction force instruction value FAc is expressed as:

$$FAc=FA+FA_{hosei} \quad (Eq. 4)$$

At the next step S700, controller 50 provides the corrected reaction force instruction value FAc to the accelerator pedal reaction force regulator 60 (see FIG. 1). In response to the instruction value FAc, accelerator pedal reaction force regulator 60 regulates servo motor 61 to adjust the reaction force generated via accelerator pedal 62. The present loop of the main routine ends at step S700, t.

Referring to FIG. 11, the first exemplary embodiment is summarized by clarifying start and end timing of decrement and increment corrections of the reaction force control instruction value FA. The table in FIG. 11 tabulates the start timing of decrement correction and the end timing of the decrement correction followed by increment correction that starts with the end timing of the decrement correction, and the end timing of the increment correction. Responsive to the inter-vehicle distance D between the host vehicle and preceding vehicle starting to increase, decrement correction of the reaction force control instruction value FA starts. Subsequently, responsive to the relative speed Vr starting to decrease after an increase in the relative speed Vr (at a moment upon occurrence of a peak or the maximum in variation of the relative speed Vr), the decrement correction ends and increment correction starts. The increment correction continues until the inter-vehicle distance D increases again. As described before in connection with FIG. 10, the reaction force correction amount $FA_{hosei}$ is kept less than or equal to 0 to prevent the corrected reaction force control instruction value FAc from exceeding the reaction force control instruction value FA variable with the risk potential RP during the increment correction.

Referring to FIGS. 12(a) to 12(d), a modification to the first exemplary embodiment is described. According to the first exemplary embodiment mentioned above, the increment correction ends with resumption of an increase in the inter-vehicle distance D. Different from the first exemplary embodiment, according to the modification, the increment correction ends when a peak or the maximum in variation of the inter-vehicle distance D occurs.

FIGS. 12(a) to 12(d) show values of an inter-vehicle distance D, a relative speed Vr, a reaction force correction amount $FA_{hosei}$ and a reaction force applied to an accelerator pedal 62, relative to time.

As shown in FIG. 12(a), the host vehicle follows the preceding vehicle, and the inter-vehicle distance D is maintained constant until t1 (t=t1). During a period between t1 and t3, the inter-vehicle distance D is increasing, indicating that the host vehicle drives slower than the preceding vehicle. During the subsequent period between t3 and t4, the inter-vehicle distance D is decreasing, indicating that the host vehicle is approaching the preceding vehicle.

In a scenarios that the host vehicle is following the preceding vehicle and has an inter-vehicle distance D maintained constant (t≦t1), a risk potential RP is transmitted to a driver of the host vehicle by a reaction force input applied to accelerator pedal 62. As indicated by the solid line in FIG. 12(d), the reaction force input has a magnitude by adding an additional reaction force indicated by the reaction force control instruction value FA, which changes with the risk potential RP, to a base reaction force (indicated by the one-dot chain line) with the ordinary reaction force characteristic. The risk potential RP indicative of a state around the host vehicle, such as a collision risk between the host vehicle and the preceding vehicle, is transmitted intuitively to the driver by the reaction force input applied to accelerator pedal 62. In this traffic scene, the reaction force correction amount $FA_{hosei}$ is 0 $(FA_{hosei}=0)$.

At moment t1 when the inter-vehicle distance D begins to increase as shown in FIG. 12(a), the decrement correction of the reaction force control instruction value FA starts. This causes the reaction force correction amount $FA_{hosei}$ starts to decrease as shown in FIG. 12(c), which causes the reaction force input applied to accelerator pedal 62 to decrease in a way as shown in FIG. 12(d). The increase in the inter-vehicle distance D is transmitted clearly and without any delay to the driver by the reduction in the reaction force input applied to accelerator pedal 62. The driver perceives the reduction in the reaction force input to recognize that the host vehicle ceases to follow the preceding vehicle. The reduction in the reaction force input via accelerator pedal 62 allows the driver to follow the preceding vehicle.

Subsequently, at moment t2 when the relative speed Vr starts to decrease, the increment correction of the reaction force control instruction value FA starts although the inter-vehicle distance D is still increasing. This causes the reaction force correction amount $FA_{hosei}$ to start increasing as shown in FIG. 12(c), which causes the reaction force input via accelerator pedal 62 to increase. The reaction force input via accelerator pedal 62 increases gradually until it reaches the magnitude resulting from adding the additional reaction force indicated by the reaction force control instruction value FA to the base reaction force with the ordinary reaction force characteristic. The increment correction of the reaction force instruction value FA reaches its peak of varying of the relative force Vr at t2, allowing the system to transmit information related to a future decrease in the inter-vehicle distance D (which occurs at t3) to the driver even before the decrease actually takes place at t3. Accordingly, even if a calculation delay occurs, the system provides sufficient lead time to allow the driver to perceive a future decrease of inter-vehicle distance.

At t3, the inter-vehicle distance D begins to decrease from the peak or maximum value, causing the reaction force correction amount $FA_{hosei}$ to become 0. After the reaction force correction amount $FA_{hosei}$ becomes 0, the acceleration pedal reaction force varies with the risk potential RP. Therefore, information indicating that the host vehicle is approaching the preceding vehicle is clearly transmitted to the driver by the reaction force input via accelerator pedal 62.

Figure 12:
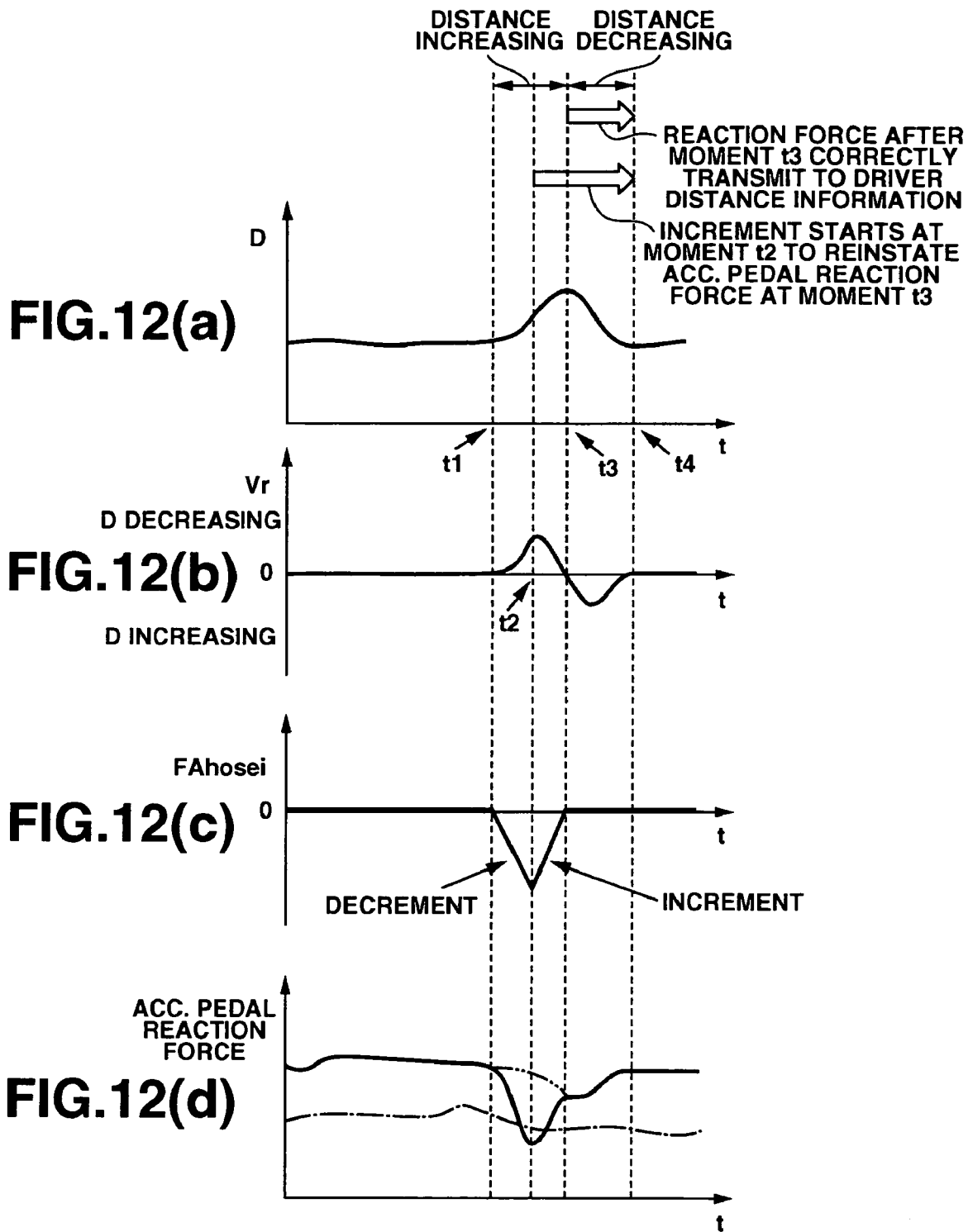
FIGS. 12(a) to 12(d) are timing charts illustrating a start and an end timing of decrement and increment corrections.

Between the period between t3 and t4, because the reaction force correction amount $FA_{hosei}$ is maintained at or below 0, according to the first exemplary embodiment shown in FIG. 11, the increment correction ends with resumption of an increase in the inter-vehicle distance D. Different from the first exemplary embodiment, according to the modification, the increment correction ends upon occurrence of a peak or the maximum in variation of the inter-vehicle distance D as shown in FIGS. 12(*a*) and 12(*c*).

The first exemplary embodiment and its modification provide features as follows:

(1) The driver assisting system 1 calculates a risk potential RP of an host vehicle based on the state of obstacles within a field around the host vehicle, and calculates a reaction force control instruction value FA based on the calculated risk RP. The reaction force control instruction value FA indicates a reaction force input by which the calculated risk RP is transmitted to the driver via accelerator pedal 62. The driver assisting system 1 calculates a reaction force correction amount $FA_{hosei}$ based on an inter-vehicle distance D between the host vehicle and the preceding vehicle, and a relative speed Vr between the host vehicle and the preceding vehicle. The driver assisting system 1 carries out an increment correction after carrying out a decrement correction to use the reaction force control amount $FA_{hosei}$ for decreasing and then increasing the reaction force control instruction value FA. With this correction technique, the system transmits to the driver a predetermined variation in the inter-vehicle distance D by changing a reaction force input applied to accelerator pedal 62, as well as transmitting the calculated risk potential RP by the reaction force input applied to accelerator pedal 62.

(2) The driver assisting system 1 calculates a risk potential RP of an host vehicle based on the state of obstacles in a field around the host vehicle and calculates a reaction force control instruction value FA based on the calculated risk RP. The reaction force control instruction value FA indicates a reaction force input by which the calculated risk RP is transmitted to the driver via accelerator pedal 62. The driver assisting system 1 calculates a reaction force correction amount $FA_{hosei}$, on the restraint that the reaction force correction amount $FA_{hosei}$ does not exceed the reaction force control instruction value FA, based on an inter-vehicle distance D between the host vehicle and the preceding vehicle in front, and a relative speed Vr between the host vehicle and the preceding vehicle. The driver assisting system 1 carries out an increment correction after carrying out a decrement correction for decreasing and then increasing the reaction force control instruction value FA. With this correction technique, the system transmits to a driver a predetermined variation in the inter-vehicle distance D by changing a reaction force input via accelerator pedal 62, as well as the calculated risk potential RP by the reaction force input via accelerator pedal 62.

(3) Based on the inter-vehicle distance D and the relative speed Vr, the correction amount calculation unit 54 determines start timing and end timing of the decrement correction, and start timing and end timing of the increment correction. In order to transmit a variation in the inter-vehicle distance D by a change in reaction force input via accelerator pedal 62, it is not preferable to start performing decrement and increment corrections only upon detecting changes in the inter-vehicle distance. However, the use of both relative speed Vr and inter-vehicle distance D to determined the start and end timing of the decrement and increment correction can transmit appropriate information to the driver without any delay by avoiding the above-mentioned problem.

(4) The correction amount calculation unit 54 allows the decrement correction to start when the inter-vehicle distances D begins to increase, and to end upon occurrence of a peak or a maximum value of the relative speed Vr. The decrement correction continues from moment t1 when the inter-vehicle distance D begins to increase, to t2 upon occurrence of a peak of the relative speed Vr as shown in FIGS. 12(*a*) to 12(*d*). This change transmits an increase in the inter-vehicle distance D, i.e., status of the preceding vehicle, to the driver at an early timing. As the reaction force input via accelerator pedal 62 drops due to the decrement correction, the driver can easily follow the preceding vehicle that drives faster than the host vehicle.

(5) The correction amount calculation unit 54 allows the increment correction to start upon occurrence of a peak or the maximum value of the relative speed Vr and to end upon occurrence of a peak or the maximum value of the inter-vehicle distance D. The increment correction continues from t2 upon occurrence of a peak of the relative speed Vr to t3 upon occurrence of a peak of the inter-vehicle distance D as shown in FIGS. 12(*a*) to 12(*d*). As such, the system can start processing for transmitting a decrease in the inter-vehicle distance D to the driver well before the actual decrease of inter-vehicle distance actually takes place at t3, to avoid any possible delays in transmitting information caused by calculations.

(6) The correction amount calculation unit 54 allows the decrement correction to start when the inter-vehicle distance D starts increasing, allows the decrement correction to end and the increment correction to start upon occurrence of a peak of the relative speed Vr, and allows the increment correction to end upon occurrence of a peak of the inter-vehicle distance D. As such, the system transmits an increase in the inter-vehicle distance D to the driver in an early stage. The system is able to start processing transmission of a decrease in the inter-vehicle distance D to the driver well before the actual decrease takes place at t3, which remedies any possible delay cause by calculations.

Second Exemplary Embodiment

The second exemplary embodiment is substantially the same as the first exemplary embodiment shown in FIGS. 1 and 2. The second exemplary embodiment is different from the first exemplary embodiment in the manner that decrement and increment corrections of the reaction force control instruction value FA are performed.

In the first exemplary embodiment, the reaction force control amount $FA_{hosei}$ is subject to the predetermined unit change $\Delta F$ and confined within a range having an upper limit of 0 and a lower limit of the minimum value $FA_{min}$. Both the predetermined unit change $\Delta F$ and the minimum value $FA_{min}$ are fixed. According to the second exemplary embodiment, a unit change $\Delta F$ and a minimum value $FA_{min}$ are varied with different operation states of host vehicle.

Figure 13:
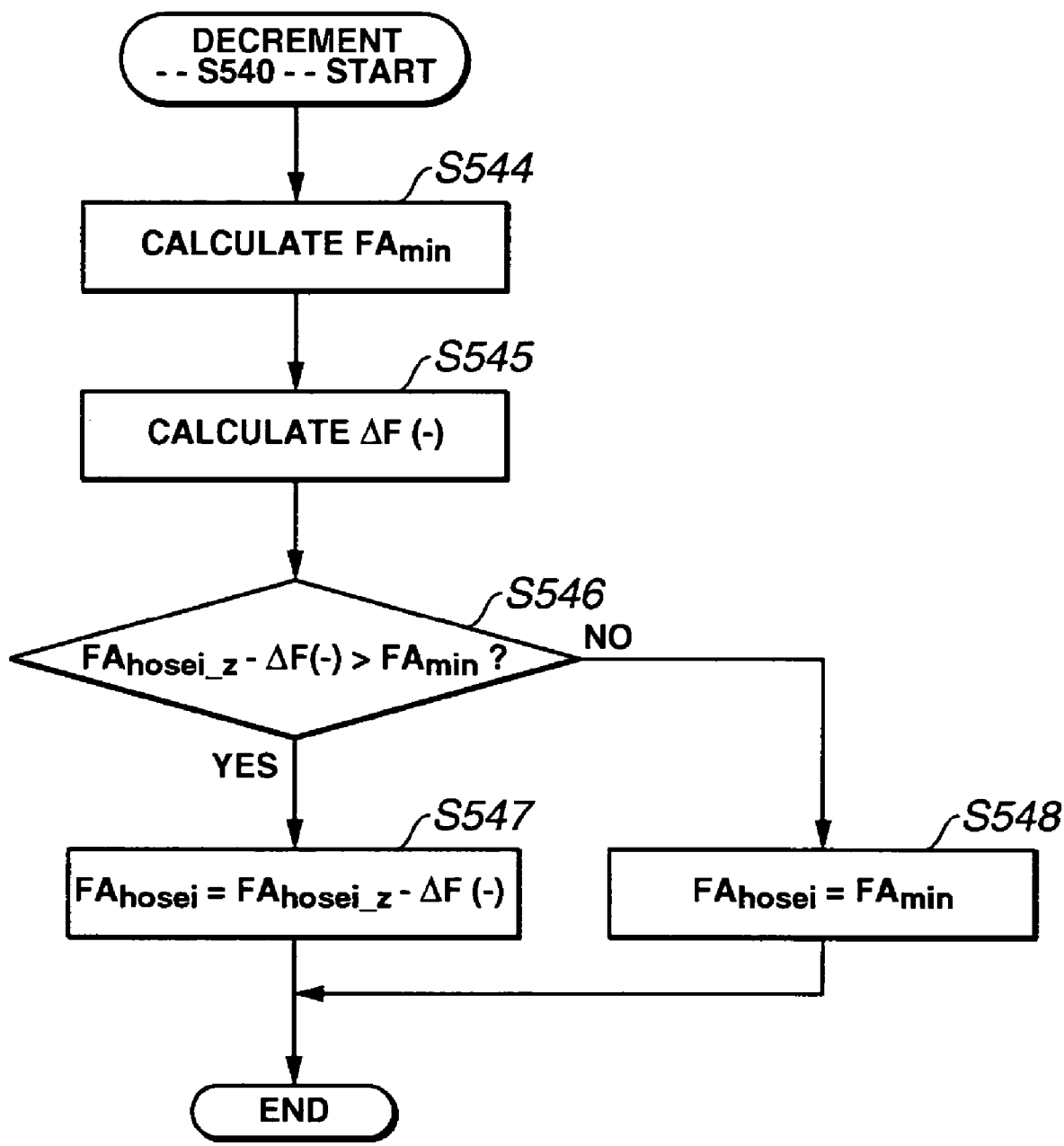
FIG. 13 is a flow chart, similar to FIG. 9, of another sub-routine for decrement correction used in a second exemplary embodiment.

FIGS. 13 to 16 illustrate the decrement and increment corrections of the reaction force control instruction value FA. The flow chart in FIG. 13 illustrates a sub-routine to be executed at step S540 of the sub-routine shown in FIG. 6 to carry out a decrement correction of the reaction force control instruction value FA.

Referring to the sub-routine in FIG. 13, at step 544, a controller 50 calculates a minimum value $FA_{min}$ of a reaction force correction amount $FA_{hosei}$ based on a time headway THW between the host vehicle and the preceding vehicle.

Figure 14:
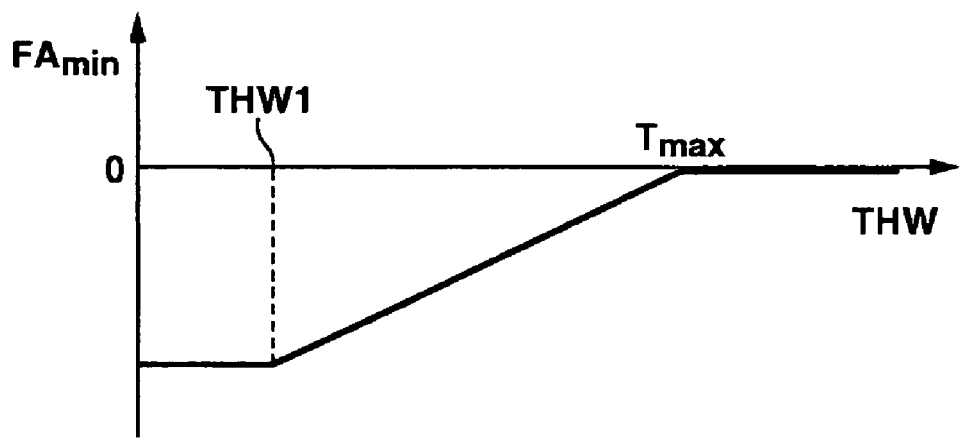
FIG. 14 is a graphical representation of varying of a minimum value $FA_{min}$ of the reaction force correction amount $FA_{hosei}$ with different values of time headway THW.

FIG. 14 illustrates varying of the minimum value $FA_{min}$ with different values of THW. As shown in FIG. 14, the less the time headway THW and hence the greater a degree of approach between the own and the preceding vehicles, the less the minimum value $FA_{min}$ is. When the time headway THW is less than or equal to a first predetermined value THW1, the minimum value $FA_{min}$ is fixed at a predetermined value. When the time headway THW is greater than or equal to a second predetermined value $T_{max}$, the minimum value $FA_{min}$ is fixed at 0 ($FA_{min}$=0).

Figure 15:
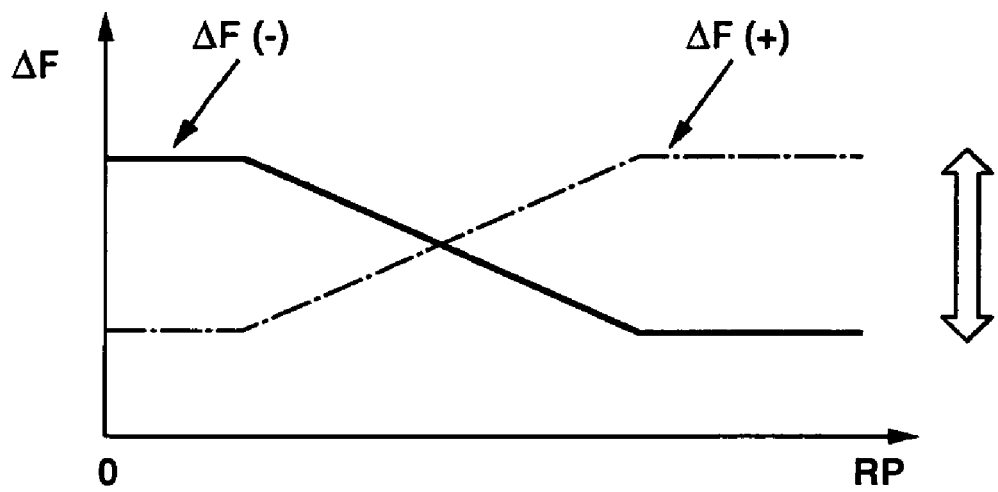
FIG. 15 is a graphical representation of varying, in magnitude, of a unit change $\Delta F(-)$ of decrement correction with different value of the risk potential RP (the fully drawn line) and varying, in magnitude, of a unit change $\Delta F(+)$ of increment correction with different values of the risk potential RP (the one-dot chain line).

At the next step S545, controller 50 calculates a unit change $\Delta F(-)$ of the reaction force correction amount $FA_{hosei}$ based on risk potential RP of the host vehicle. FIG. 15 shows varying of the unit change $\Delta F$ of the reaction force correction amount $FA_{hosei}$ with different values of the risk potential RP. The solid line in FIG. 15 shows $\Delta F(-)$ changing with different values of the risk potential RP. As illustrated by the solid line in FIG. 15, controller 50 sets the unit change $\Delta F(-)$ such that the greater the risk potential RP, the less the unit change $\Delta F(-)$ is.

At step S546, controller 50 determines whether or not the minimum value $FA_{min}$ calculated at step S544 is exceeded by a value of subtracting the unit change $\Delta F(-)$ calculated at step S545 from the last value of a reaction force correction amount $FA_{hosei\_z}$ that was set during the previous cycle. If, at step S546, $\{FA_{hosei\_z}-\Delta F(-)\}$ is greater than $FA_{min}$, the routine proceeds to step S547. At step S547, controller 50 sets the reaction force correction amount $FA_{hosei}$ equal to $\{FA_{hosei\_z}-\Delta F(-)\}$ ($FA_{hosei}=FA_{hosei\_z}-\Delta F(-)$). If, at step S546, $\{FA_{hosei\_z}-\Delta F(-)\}$ is less than or equal to $FA_{min}$, the routine proceeds to step S548. At step S548, controller 50 sets the reaction force correction amount $FA_{hosei}$ equal to $FA_{min}$.

Figure 16:
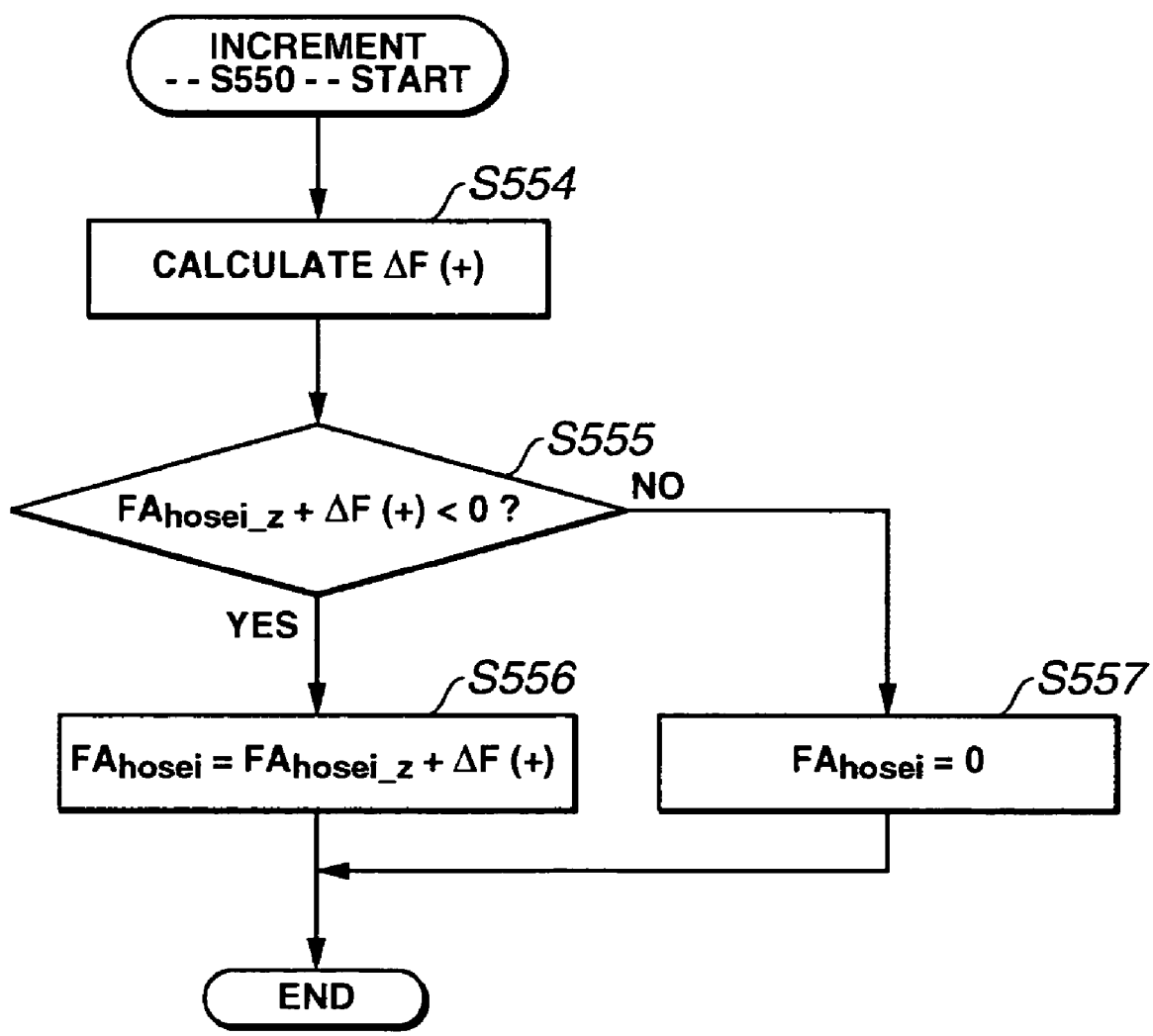
FIG. 16 is a flow chart, similar to FIG. 10, of another sub-routine for increment correction used in the second exemplary embodiment.

The flow chart in FIG. 16 illustrates a sub-routine to be executed at step S550 of the sub-routine shown in FIG. 6 to carry out an increment correction of the reaction force control instruction value FA.

Referring to the sub-routine in FIG. 10, at step 554, controller 50 calculates a unit change $\Delta F(+)$ of the reaction force correction amount $FA_{hosei}$ based on the risk potential RP using the relationship shown in FIG. 15. As illustrated by the one-dot chain line in FIG. 15, the greater the risk potential RP, the greater the unit change $\Delta F(+)$ is.

At step S555, controller 50 determines whether a value of adding the unit change $\Delta F(+)$ calculated at step S554 to a last value of a reaction force correction amount $FA_{hosei\_z}$ that was set during the preceding cycle is less than 0. If, at step S555, $\{FA_{hosei\_z}+\Delta F(+)\}$ is less than 0, the routine proceeds to step S556. At step S556, controller 50 sets the reaction force correction amount $FA_{hosei}$ equal to $\{FA_{hosei\_z}+\Delta F(+)\}$ ($FA_{hosei}=FA_{hosei\_z}+\Delta F(+)$). If, at step S555, $\{FA_{hosei\_z}+\Delta F(+)\}$ is greater or equal to 0, the routine proceeds to step S557. At step S557, controller 50 sets the reaction force correction amount $FA_{hosei}$ equal to 0.

When the risk potential RP is large, an increase in inter-vehicle distance D causes a decrement correction to proceed at a slower rate and the subsequent increment correction to proceed at a faster rate. When the risk potential RP is small, an increase in inter-vehicle distance D causes a decrement correction to proceed at a faster rate and the subsequent increment correction to proceed at a slower rate.

When the time headway THW is large, which indicates that the host vehicle and the preceding vehicle have a satisfactory distance, the minimum value $FA_{min}$ falls to around 0. Under this condition, an increase in inter-vehicle distance D is transmitted to the driver in a less significant way because a depth of the decrement correction from 0 to the minimum value $FA_{min}$ is limited. When the time headway THW is small, which indicates that the host vehicle is approaching the preceding vehicle, the minimum value $FA_{min}$ is significantly less than 0 in order to provide a deeper depth of the decrement correction from 0 to the minimum value $FA_{min}$. Under this condition, if the risk potential RP is large, an increase in inter-vehicle distance D causes a decrement correction at a slower rate. This prevents the driver from depressing accelerator pedal 62 deeper than necessary.

In addition to the features provided by the first exemplary embodiment, the second exemplary embodiment provides further features below.

(1) The correction amount calculation unit 54 calculates the minimum value $FA_{min}$ (the lower limit) of the reaction force correction amount $FA_{hosei}$ based on the time headway THW between the host vehicle and the preceding vehicle. As shown in FIG. 14, the smaller the time headway THW and the more the host vehicle approaches the preceding vehicle, the smaller the minimum value $FA_{min}$ is. Because a depth of the decrement correction becomes large, a variation in the state of the preceding vehicle is transmitted to the driver with stronger emphasis. When the time headway THW is large indicating that the host vehicle and the preceding vehicle are separated satisfactorily, the minimum value $FA_{min}$ is set to be around 0. Under this condition, an increase in the inter-vehicle distance D is transmitted to the driver in a less significant way because the depth of the decrement correction from 0 to the minimum value $FA_{min}$ is limited, hence avoids annoyance to the driver.

(2) The correction amount calculation unit 54 sets unit changes $\Delta F$ of the reaction force correction amount $FA_{hosei}$ for the decrement and increment corrections, respectively. In order to allow the decrement correction to decrease the reaction force correction amount $FA_{hosei}$ and the increment correction to increase the reaction force correction amount $FA_{hosei}$ at the same rate, the correction amount calculation unit 54 matches the unit change $\Delta F(-)$ for decrement correction to the unit change $\Delta F(+)$ for increment correction. In this case, the driver can anticipate the rate at which the reaction force input via accelerator pedal 62, thus causing annoyance to the driver.

(3) When the unit change $\Delta F(-)$ for the decrement correction is set larger than the unit change $\Delta F(+)$ for the increment correction to carry out the decrement correction at a faster or quicker rate, the reaction force input via accelerator pedal 62 decreases at the faster rate immediately after the inter-vehicle distance D begins increasing, so that the information indicating the host vehicle ceasing to follow the preceding vehicle is transmitted to the driver in a clear manner.

(4) When the unit change $\Delta F(-)$ for the decrement correction is set smaller than the unit change $\Delta F(+)$ for the increment correction to carry out the decrement correction at a slower rate, the reaction force input via accelerator pedal 62 decreases at the slow rate immediately after the inter-vehicle distance D begins increasing, and the reaction force input increases at a fast rate immediately after occurrence of a peak in variation of the relative speed Vr. This allows the system to resume transmission of the risk potential RP to the driver immediately after transmitting to the driver the variation in the inter-vehicle distance D.

(5) The correction amount calculation unit 54 calculates the rate at which the decrement and increment corrections are carried out based on the risk potential RP based on the risk potential RP, the unit change $\Delta F(-)$ for the decrement correction and the unit change $\Delta F(+)$ for the increment correction are calculated. This allows the system to carry out the decrement and increment corrections in response to the risk potential RP with respect to the preceding vehicle.

In each of the first and second exemplary embodiments, the risk potential RP is calculated using equation 3 based on the time headway THW between the host vehicle and the preceding vehicle, and the time to contact TTC between them. This is just one of various examples for calculating the risk potential RP. Additional approaches known to the people skilled in the art may also be used. For example, the risk potential RP may be calculated based on the inter-vehicle distance D or the relative speed Vr or the reciprocal of TTC.

In the second exemplary embodiment, the minimum value $FA_{min}$ is calculated based on the time headway THW by referring to FIG. 14, and the unit change $\Delta F$ is calculated based on the risk potential RP by referring to FIG. 15. This is just one of various example of calculating them. Additional approaches known to the people skilled in the art may also be used. For example, the minimum value $FA_{min}$ may be set based on the risk potential RP or the unit change $\Delta F$ may be calculated based on the time headway THW.

In each of the first and second exemplary embodiments, the map illustrated in FIG. 5 is used to calculate the reaction force control instruction value FA based on the risk potential RP. The illustrated map is one of various examples. Other maps may be used as long as they provide reaction force control instruction value FA increasing as the risk potential RP increases.

In each of the first and second embodiments, the laser radar 10 and the vehicle speed sensor 20 constitute an obstacle detecting device and an obstacle recognition unit. The risk potential calculation unit 52 constitutes a risk calculation unit. The reaction force control instruction value calculation unit 53 constitutes a reaction force control instruction value calculation unit. The correction unit 55 constitutes a correction unit. The correction amount calculation unit 54 constitutes a correction amount calculation unit. The accelerator pedal reaction force regulator 60 constitutes a reaction force regulator. The laser radar 10 is one of various examples of sensors or detector for detecting the presence of obstacles and status of each of the obstacles. The laser radar 10 may be replaced by a radar of the millimeter wave type or a CCD camera or a CMOS camera. The driver controlled input device in the form of an accelerator pedal is used in each of the exemplary embodiments. The driver controlled input device may be a brake pedal or a steering wheel. In this case, a brake pedal reaction force regulator may constitute the reaction force regulator.

While the illustrative embodiments for the disclosure have been described in detail, those familiar with the art to which the present disclosure relates will recognize various alternative designs and embodiments for practicing the disclosure as defined by the following claims. It is to be understood that the disclosure is capable of use in various other combinations and environments and is capable of changes or modifications within the scope of the inventive concept as expressed herein.

What is claimed is:

1. A driving assisting system for use in a vehicle including an accelerator pedal manipulated by a vehicle driver, the driving assisting system comprising:
a detector configured to detect a relative distance from the vehicle to an object in a field around the vehicle and a relative speed between the vehicle and the object;
a controller calculating a risk potential with respect to the object, calculating a reaction force instruction value based on the calculated risk potential, determining a correction amount based on the relative distance and the relative speed, and correcting the reaction force instruction value by the correction amount; and
an accelerator pedal reaction force regulator that changes a reaction force input applied to the accelerator pedal based on the corrected reaction force instruction value to transmit to the vehicle driver a future decrease of the relative distance as well as the calculated risk potential by the reaction force input.

2. The system of claim 1, wherein the controller keeps the correction amount less than or equal to zero to prevent the corrected reaction force instruction value from exceeding the reaction force instruction value.

3. The system of claim 2, wherein the correction amount begins to decrease from zero when the relative distance begins to increase and subsequently the correction amount stops decreasing and begins to increase when subsequently the relative speed begins to decrease.

4. The system of claim 3, wherein the correction amount continues to increase until the relative distance increases again.

5. The system of claim 3, wherein the correction amount stops increasing when subsequently the relative distance begins to decrease.

6. The system of claim 1, wherein the controller starts correcting the reaction force instruction value by the correction amount upon anticipating the future decrease of the relative distance based on a change of the relative speed.

7. The system of claim 6, wherein the controller determines a trend of the relative speed and the correction amount based on the trend of the relative speed.

8. The system of claim 7, wherein
the relative speed represents a speed of the object relative to the vehicle;
the object is in front of the vehicle; and
the correction amount begins to increase when the relative speed changes from an increasing relative speed to a non-increasing relative speed.

9. The system of claim 8, wherein the correction amount stops increasing when the relative speed decreases to zero.

10. The system of claim 1, wherein the correction amount stops increasing when the relative distance changes from a non-increasing distance to an increasing distance.

11. The system of claim 1, wherein
the relative speed represents a speed of the object relative to the vehicle; and
the correction amount begins to decrease when the relative speed changes from a non-increasing speed to an increasing speed, or the relative distance changes from a non-increasing distance to an increasing distance.

12. The system of claim 11, wherein the reaction force instruction value stops decreasing when the relative speed changes from an increasing speed to a non-increasing speed.

13. The system of claim 6, wherein a rate of change of the reaction force instruction value varies with the calculated risk potential when the future decrease of the distance is not anticipated.

14. The system of claim 6, wherein a change of the reaction force instruction value associated with a higher value of the calculated risk potential is more significant than a change of the reaction force instruction value associated with a lower value of the calculated risk potential when the future decrease of the distance is not anticipated.

15. The system of claim 14, wherein:
the reaction force instruction value is corrected such that it is incremented by the correction amount;
the correction amount is adjusted such that it is incremented by an unit increment amount or an unit decrement amount; and the correction amount has a maximum value and a minimum value and adjustable between the maximum value and the minimum value.

16. The system of claim 15, wherein the minimum value of the correction amount is adjustable based on the calculated risk potential.

17. The system of claim 16, wherein the minimum value of the correction amount increases with the value of time headway between the vehicle and the object decreases.

18. The system of claim 15, wherein at least one of the unit increment amount and the unit decrement amount is adjustable based on the calculated risk potential.

19. The system of claim 15, wherein the controller is configured to perform the steps of:
adjusting the correction amount by incrementing the correction amount by one of the increment amount and the decrement amount;
responsive to incrementing the correction amount by the decrement amount, comparing the adjusted correction amount with the minimum value of the correction amount;
responsive to the adjusted correction amount being larger than the minimum value, adjusting the reaction force instruction value by incrementing the reaction force instruction value by the adjusted correction amount; and
responsive to the adjusted correction amount being smaller than the minimum value of the correction, adjusting the reaction force instruction value by incrementing the reaction force instruction value by the minimum value of the correction amount;
and
responsive to incrementing the correction amount by the increment amount, comparing the adjusted correction amount with the maximum value of the correction amount;
responsive to the adjusted correction amount being smaller than the maximum value of the correction amount, adjusting the reaction force instruction value by incrementing the reaction force instruction value by the adjusted correction amount; and
responsive to the adjusted correction amount being larger than the maximum value of the correction amount, adjusting the reaction force instruction value by incrementing the reaction force instruction value by the maximum value of the correction amount.

20. The system of claim 6, wherein the timing to start and stop correcting the reaction force instruction value are determined based on the relative distance and the relative speed.

21. The system of claim 1, wherein the reaction force instruction value changes to reflect a change in the relative distance.

22. The system of claim 15, wherein the correction amount is adjusted to increase or decrease at the same rate, to increase faster than decrease, or to increase slower than decrease.

23. The system of claim 8, wherein the reaction force instruction value stops increasing when the relative distance changes from a non-decreasing distance to a decreasing distance.

24. A driving assisting method for use in a vehicle including an accelerator pedal manipulated by a vehicle driver, the driving assisting method comprising:
detecting a relative distance from the vehicle to an object in a field around the vehicle;
detecting a relative speed between the vehicle and the object;
calculating a risk potential with respect to the object;
calculating a reaction force instruction value based on the calculated risk potential,
determining a correction amount based on the relative distance and the relative speed;
correcting the reaction force instruction value by the correction amount; and
changing a reaction force input applied to the accelerator pedal based on the corrected reaction force instruction value to transmit to the vehicle driver a future decrease of the relative distance as well as the calculated risk potential by the reaction force input.

25. The system of claim 1, wherein the controller performs the step of correcting the reaction force instruction value by the correction amount responsive to the relative distance changing from a non-increasing distance to an increasing distance.

26. The system of claim 25, wherein the step of correcting the reaction force instruction value by the correction amount includes a decrement of the reaction force instruction value followed by an increment of the reaction force instruction value.

27. The system of claim 26, wherein the reaction force instruction value decreases at a first rate during the decrement of the reaction force instruction value and increases at a second rate during the increment of the reaction force instruction value.

28. The system of claim 27, wherein the first rate is equal in magnitude to the second rate.

29. The system of claim 27, wherein the first rate is greater in magnitude than the second rate.

30. The system of claim 27, wherein the second rate is greater in magnitude than the first rate.

* * * * *